Sept. 23, 1969  E. GREACEN  3,469,234
VISUAL SIGHTING DEVICE
Filed Aug. 16, 1966  3 Sheets-Sheet 1
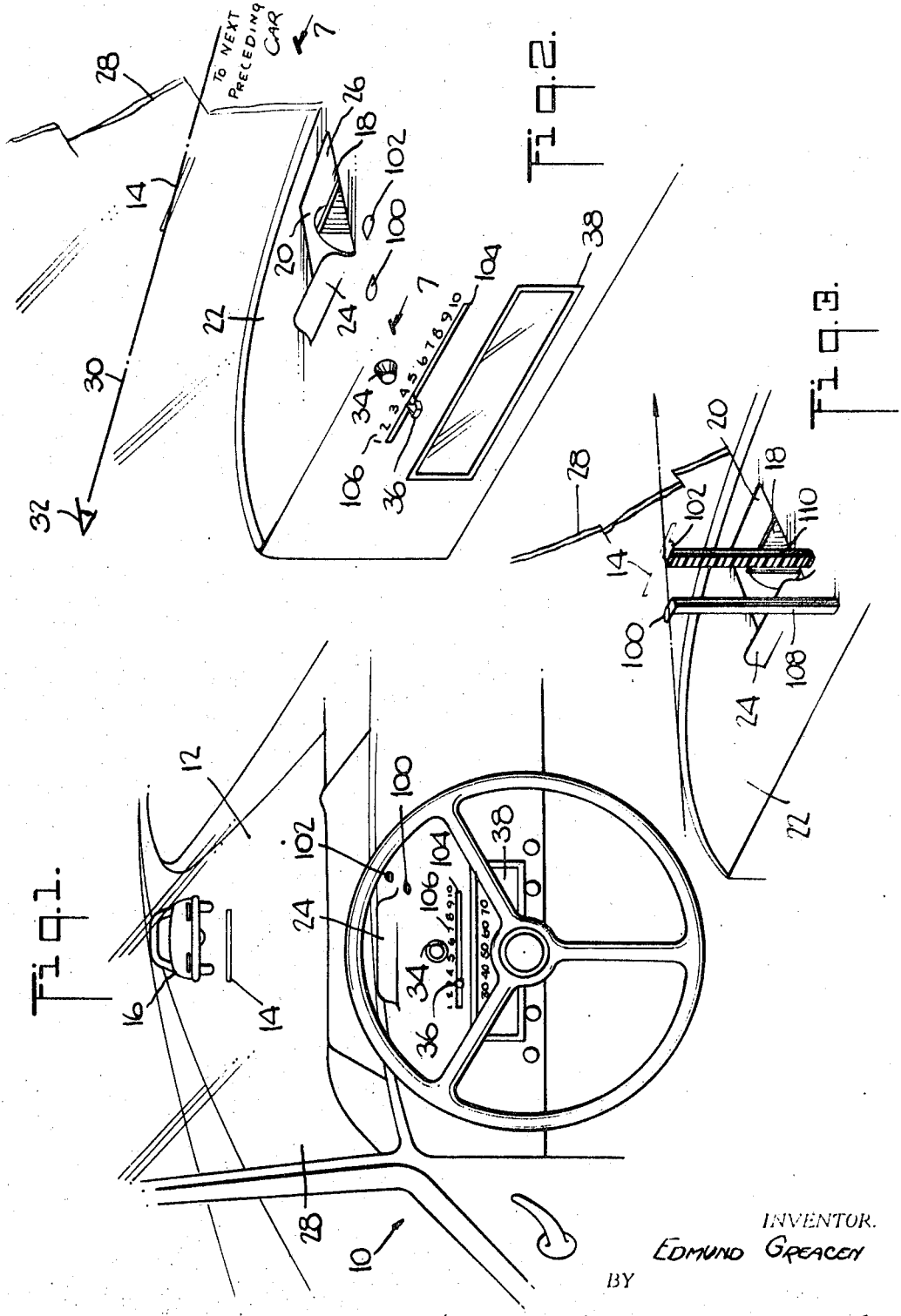
INVENTOR.
EDMUND GREACEN
BY
Ward, Haselton, McElwain, Irene, Brooks & Fitzpatrick
ATTORNEYS

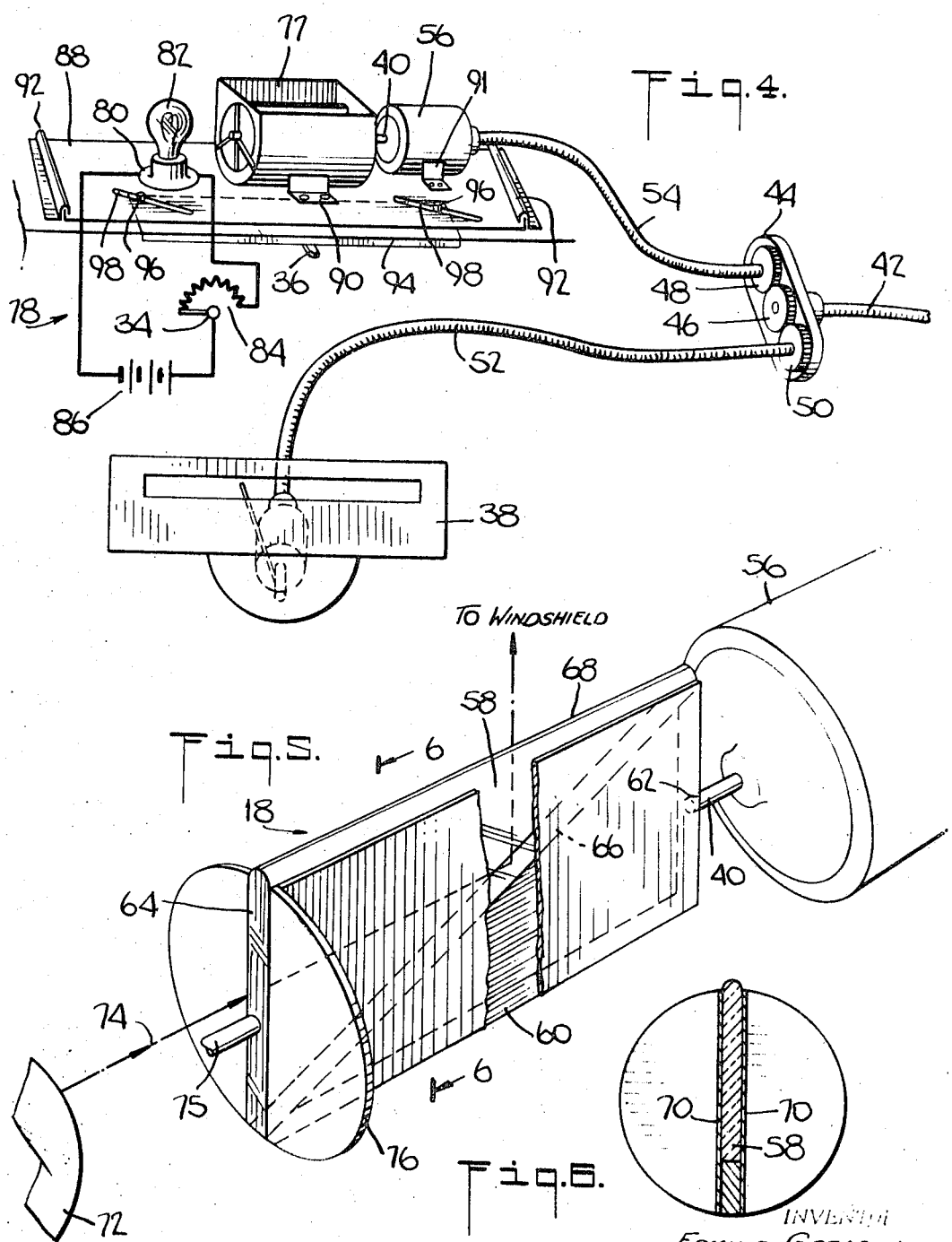

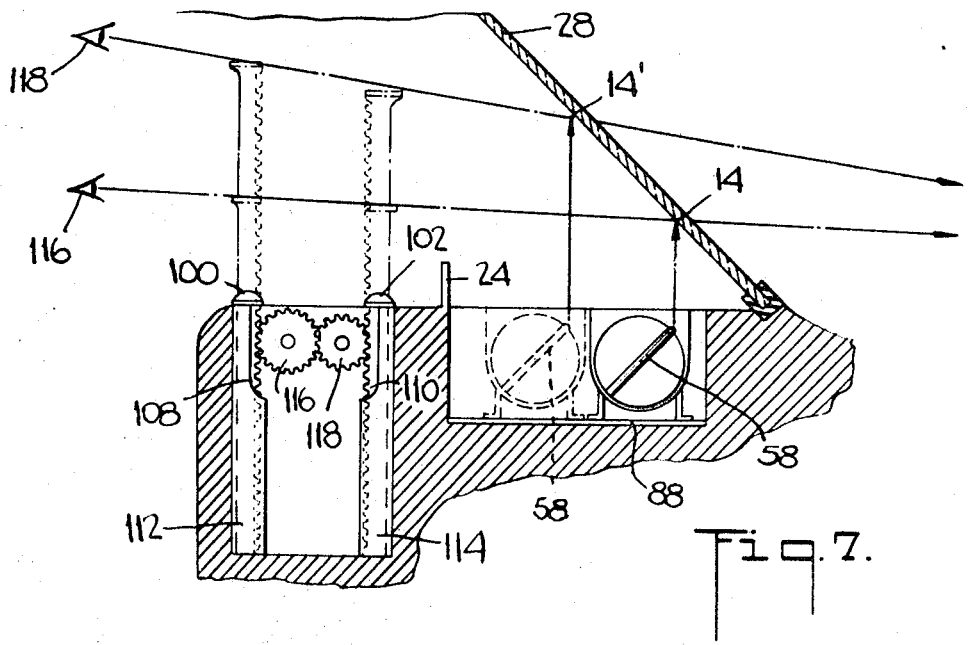
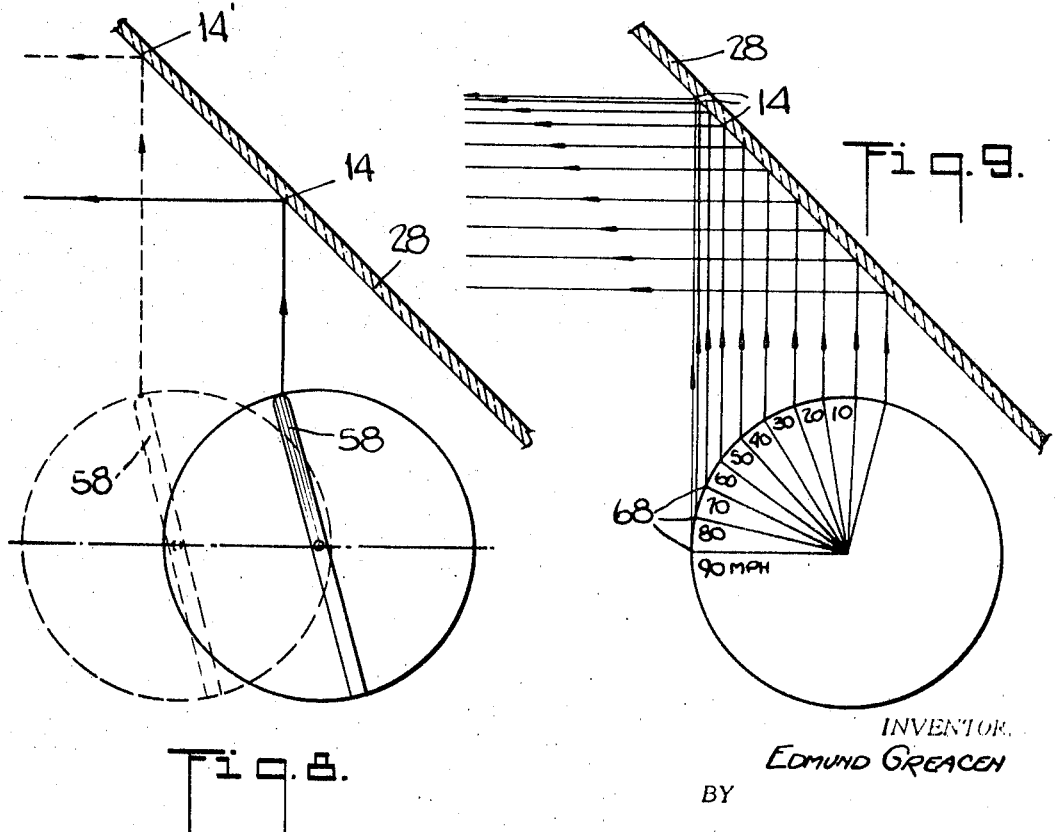

United States Patent Office 3,469,234
Patented Sept. 23, 1969

3,469,234
VISUAL SIGHTING DEVICE
Edmund Greacen, 106 Woodcrest Ave.,
White Plains, N.Y. 10604
Continuation-in-part of application Ser. No. 481,432,
Aug. 20, 1965. This application Aug. 16, 1966, Ser.
No. 572,859
Int. Cl. B60r 27/00; G01c 3/12
U.S. Cl. 340—104                                    25 Claims

ABSTRACT OF THE DISCLOSURE

This invention relates to a visual sighting device for automatically and continuously indicating to the operator of a motor vehicle a safe distance between his motor vehicle and the next preceding motor vehicle.

---

This application is a continuation-in-part application of my copending application Ser. No. 509,255, filed Oct. 24, 1965, now abandoned, which is a continuation-in-part application of application Ser. No. 481,432, filed Aug. 20, 1965, now abandoned.

This invention relates to motor vehicle safety devices, and more particularly to a device for gauging the spacing or distance between a motor vehicle and the next preceding motor vehicle traveling in the same direction on a roadway. Among other possible uses, the device, according to this invention, is particularly useful to the operator of a motor vehicle for maintaining a substantially safe distance behind the next preceding motor vehicle.

Heretofore, considerable difficulty has been experienced due to the inability of a motor vehicle operator to accurately judge the distance between his motor vehicle and the next preceding vehicle, and maintain a safe distance therebehind. This leads to what is known as "tailgating." That is, when one vehicle follows the next vehicle too closely. Rear end collisions are often the result of one vehicle following the next vehicle too closely, and on high speed highways such spacing frequently results in multiple collisions, sometimes involving twelve to fifteen vehicles. Attempts have been made to overcome these difficulties, but they have not been entirely successful.

Briefly, the present invention contemplates the provision of a new and improved device for indicating to the operator of a motor vehicle whether or not he is maintaining a safe distance between his vehicle and the next preceding vehicle, said device including a shaft and means for angularly positioning said shaft responsive to the motor vehicle's speed. A member is attached to the shaft and has a light reflecting surface. A light source is provided which is disposed adjacent the member so that the light is reflected from said surface forming an indicator image guide line on the windshield in the operator's line of vision between the operator and the next preceding vehicle.

A feature of my invention resides in the provision of a new and improved direct visual sighting device which accurately indicates to the operator whether or not he is maintaining a safe distance between his vehicle and the vehicle in front of him, which takes into consideration the driving speed of the motor vehicle, and which takes into consideration the vertical elevation of a driver's line of vision.

Another feature of the invention is the provision of a direct visual sighting device of the character aforesaid which does not obstruct or interfere with the operator when driving, and which is simple to operate without requiring much conscious thought so that it does not distract from the operator's concentration on his driving.

Still another feature of my invention resides in the provision of a direct visual sighting device which is of simple well-balanced construction, which may be readily and economically fabricated and assembled on a mass production basis, which is sturdy and durable and which is capable of a long service life with relatively minor repairs.

According to the invention, another feature resides in the provision of a new and improved direct visual sighting device which operates accurately and reliably so that the operator of a motor vehicle can with certainty depend thereon.

Still another feature of my invention is the provision of a direct visual sighting device which is readily adjustable for night, day, or other special driving conditions.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject to the claims appended hereto. Those skilled in the art will appreciate that the conception upon which this disclosure is based may readily be utilized as the basis for the designing of other structures for carrying out the several purposes of the invention. It is important, therefore, that the claims be regarded as including such equivalent constructions as do not depart from the spirit and scope of the invention.

An embodiment of the invention has been chosen for purposes of illustration and description and is shown in the accompanying drawings, forming a part of the specification, wherein:

FIG. 1 is a perspective view of a direct visual sighting device, in association with a conventional motor vehicle, as seen by the operator during operation of the vehicle when the next preceding motor vehicle is a safe distance ahead;

FIG. 2 is a perspective view of the dashboard of a motor vehicle showing the installation of the sighting device;

FIG. 3 is a fragmentary view of the dashboard showing the means for correcting for parallax;

FIG. 4 is a perspective view of the visual sighting device showing the interrelationship of the various components;

FIG. 5 is an enlarged perspective view of the plate member, showing its edges and means for mounting same;

FIG. 6 is a sectional view of the plate member taken along the line indicated at 6—6 in FIG. 5;

FIG. 7 is a vertical sectional view showing the plate member and the sighting members with respect to the windshield;

FIG. 8 is a diagrammatic view showing the plate member and the windshield for operators having different lines of vision; and FIG. 9 is a diagrammatic view showing the windshield and plate member in various angular positions corresponding to various rates of speed.

In the illustrated embodiment of my invention, and with particular reference to FIG. 1, there is shown my new and improved sighting device as viewed by the operator of a motor vehicle indicated generally at 10 when in use on a highway 12. The reflected luminous guide-line 14 is shown below the next preceding motor vehicle 16. It will be appreciated that the position of the guide-line 14 indicates to the driver whether or not he has sufficient distance between his vehicle and the next preceding vehicle. If the guide-line is below the wheels of the preceding vehicle, he is driving safely, but if the guide-line is above the bottom of the wheels of the preceding vehicle, he is too close to safely make an emergency stop.

The sighting device comprises a rotatable luminous indicator plate 18 mounted in an open topped enclosure 77, FIG. 4, whose interior surfaces have a matte black finish. This assembly is attached to tray 88, FIG. 4, and therefore moves with tray 88 under opening 20, FIG. 2, in the dashboard 22. A small vertical shield 24 is provided for preventing the operator from looking directly into the opening 20. A transparent plastic cover 26 completely covers the opening to prevent dirt and other foreign material from entering therein. When the device is operated the luminous guide-line 14 is reflected on the windshield 28 from the luminous indicator bar 18. Accordingly, it is seen that the operator's line of vision or sight 30 extends from the operator's eye to the image 14 and on towards the next preceding car. A dimmer control 34 varies the brightness of the luminous indicator 18. As will be more fully discussed hereinafter, control means 36 are provided for adjusting the reference height of the reflected luminous guide-line depending upon the height of the line of vision of the operator. Still referring to FIG. 2 a conventional speedometer 38 is mounted on the dashboard 22.

Referring to FIG. 4, the sighting device comprises a shaft 40 and means for angularly positioning said shaft responsive to the motor vehicle speed, including a speed cable 42, and a gear box 44 having a gear 46 which is driven by said cable. Also mounted in the gear box 44 are gears 48 and 50 which are driven by gear 46. The gear 50 drives the cable 52 which, in turn, drives the conventional speedometer 38. The gear 48 drives flexible cable 54 which drives magnetic speedometer driving or actuating mechanism 56. As more fully discussed in patent application Ser. No. 509,255, above referred to, mechanism 56 includes an inner member which rotates conjointly with the speedometer cable. The rotation of the inner member acting in a magnetic field causes arcuate movement of the shaft 40, the degree of arcuate movement reflecting the speed of the vehicle.

Referring next to FIG. 5, shaft 40 is fixedly attached to the rotatable luminous indicator plate 18. This member or plate has a transparent portion 58 which may be transparent plastic, for example, and a second portion 60 which is similar in size and shape and is used to balance the transparent portion 58. The drive shaft 40 is fixedly mounted on portion 60 as at 62. The portion 58 has a highly polished first edge 64 for light transmission and a second edge 66 which is angularly disposed with respect to the first edge 64 and connects the transparent portion 58 to the other portion 60 so that two right triangles are formed. A third frosted edge 68 is rounded and is used for light transmission to the windshield forming the reflected luminous guide-line 14, FIG. 1. This edge is luminous regardless of the angle of rotation. For supporting purposes, a pivot 75 is fixedly mounted on edge 64, as shown. A light source 72 provides a light beam 74 which passes through edge 64 and is reflected off the edge 66 and diffused by edge 68 before passing to the windshield. As diagrammatically seen in FIG. 9, a series of angular positions of the edge 68 are shown corresponding to the angular position of the shaft 40, FIGS. 4 and 5, which represents the motor vehicle speed, as indicated. It will be appreciated that uniform increments of rotation, such as are produced by a standard magnetic speedometer mechanism, results in decreasing increments of height in the reflected image of the luminous guide-line 14. These correspond to the decreasing increments of height to the operator as uniform increments are added to the distance between said vehicle and the next preceding vehicle.

As best seen in FIG. 6 thin black metal sheets 70 cover or sandwich the plate member 58 therebetween, as shown. A light shield 76, FIG. 5, which may be of split circular construction prevents extraneous light from entering the indicator enclosure 77.

The light source 72, FIG. 5, comprises an electrical circuit indicated generally at 78, FIG. 4, including a socket 80, a light bulb 82, a rheostat 84, and a battery 86. The light bulb is disposed in such a position that it directs a beam of light into the first edge 64 of the transparent portion 58 as shown in FIG. 5. The dimmer control 34, FIG. 4, varies the rheostat 84, and thereby controls the brightness of the bulb which varies the brightness of the luminous indicator 18, FIG. 1.

Means are provided for adjusting the reference position of the third edge 68, FIG. 5, to correct for the height of the driver's line of vision. As best seen in FIG. 4, this means includes a tray 88 upon which the indicator enclosure 77 is mounted as by means of brackets 90 provided for the purpose. The driving means 56 is mounted on the tray 88 as by means of bracket 91 provided for the purpose. Also, the light bulb 82 is mounted on the tray. The tray is moveable forwardly and backwardly in a horizontal plane along guides 92, resulting in vertical movement of the indicator image. A second plate-like member 94 extends substantially parallel to the tray and has a pair of spaced projections 96, such as nylon studs, for example. The tray 88 is provided with a pair of angularly disposed slots 98 for slidably receiving the projections 96, whereby lateral movement of the plate-like member causes forward and backward movement of the tray. Lateral movement of the plate-like member is assisted by control knob or tab 36 provided for the purpose.

In operation luminous guide-line 14 lights up whenever the motor vehicle ignition is turned on. After the operator has started the engine, he adjusts the guide-line 14, FIGS. 1, 3 and 7, so that it is in alignment with sights 100 and 102, FIGS. 3 and 7. The operator does this by moving control knob 36 laterally in slot 104, FIG. 2, in the dashboard. This results in vertical movement of the luminous guide-line 14 on the windshield 28, as best seen in FIGS. 7 and 8. That is, if the transparent portion 58 is moved by moving tray 88 from the position shown in the solid lines to the position shown in the broken lines, the guide-line 14 moves from position 14 to position 14' as seen in FIGS. 7 and 8. A means for correcting for parallax is necessary for the original setting of the instrument. This gives individuals of different eye levels the same starting reference point on the road ahead of the motor vehicle as they sight over the luminous guide-line 14. The setting of this guide-line is noted on the height adjustment scale 106, FIGS. 1 and 2, and it is only necessary for the operator to check to see that the height adjustment is on "his number" whenever he again drives the vehicle.

One means of correcting for parallax is shown in FIG. 7, in which sighting members 100 and 102 are attached to tooth racks 108 and 110, respectively. These racks slide in square supporting tubes 112 and 114 and they engage gears 116 and 118, respectively. Gear 116 has coaxially mounted to it gear 119 which is smaler in diameter. Gear 118 engages gear 119 so that when sight 100 and rack 108 are pulled upwardly sight 102 and rack 110 move upwardly also, but to a slightly lesser extent. Accordingly, regardless of the height of the operator, the two sights are always lined upon the same point ahead of the vehicle. As seen in FIG. 7, an operator having a lower line of vision is indicated at 116 and an operator having a higher line of vision is indicated at 118. The luminous guide-line 14 is adjusted to the sights in the manner set forth hereinbefore.

From the foregoing description, it will be seen that I have contributed by my invention a new and improved visual sighting device which accurately indicates to the operator whether or not he is maintaining a safe distance between his vehicle and the vehicle in front of him.

What is claimed and desired to be secured by Letters Patent is:

1. A visual sighting device for indicating to the operator of a motor vehicle a safe distance between his motor vehicle and the next preceding motor vehicle, said device comprising a shaft, means for angularly positioning said shaft responsive to the motor vehicle's speed, a light source, a luminus indicator plate mounted for rotational movement with said shaft to reflect a light beam from said light source to form a guide-line image at a position on the windshield of said motor vehicle, the vertical location of the position of the guide-line on the windshield being responsive to the rotational position of said plate for indicating to the driver whether or not he has sufficient distance between his vehicle and the next preceding vehicle.

2. A visual sighting device for indicating to the operator of a motor vehicle a safe distance between his motor vehicle and the next preceding motor vehicle according to claim 1 wherein said indicator plate has a transparent portion, said transparent portion having a first edge for light transmission, a second edge angularly disposed with respect to the first edge for light reflection, and a third edge angularly disposed with respect to said other two edges, the third edge being for light diffusion.

3. A visiual sighting device for indicating to an operator of a motor vehicle a safe distance between his vehicle and the next preceding motor vehicle according to claim 2 wherein said edge is arcuate.

4. A visual sighting device for indicating to an operator of a motor vehicle a safe distance between his vehicle and the next preceding motor vehicle according to claim 2 wherein the transparent portion of said indicator plate is a rotatable plate having its axis of rotation passing through said first edge.

5. A visual sighting device for indicating to an operator of a motor vehicle a safe distance between his motor vehicle and the next preceding motor vehicle according to claim 4 wherein the first edge is perpendicular to the third edge.

6. A visual sighting device for indicating to the operator of a motor vehicle a safe distance between his motor vehicle and the next preceding motor vehicle, said device comprising a shaft, means for angularly positioning said shaft responsive to the motor vehicle's speed, a member attached to said shaft, said member having a light reflecting surface, a light source disposed adjacent said member, whereby light is reflected from said surface forming an indicator image guide-line on the windshield in the operator's line of vision between the operator and the next preceding vehicle, said member having a transparent portion, said transparent portion having a first edge for light transmission, said light reflecting surface being a second edge angularly disposed with respect to the first edge for light reflection, and a third edge angularly disposed with respect to said other two edges, the third edge being for light diffusion, the transparent portion of said member being a rotatable plate having its axis of rotation passing through said first edge, said member being substantially rectangular and the second edge being a line connecting two opposite corners of the rectangle forming a division between the transparent portion and the other portion, the transparent portion being about one-half of the total member, whereby the transparent portion is substantially triangularly shaped.

7. A visual sighting device for indicating to an operator of a motor vehicle a safe distance between his motor vehicle and the next preceding motor vehicle according to claim 1 wherein opaque sheets cover the side faces of said luminous indicator plate.

8. A visual sighting device for indicating to an operator of a motor vehicle a safe distance between his motor vehicle and the next preceding motor vehicle according to claim 1 wherein said luminous indicator plate is mounted in an open topped enclosure below an opening in the dashboard of said motor vehicle.

9. A visual sighting device for indicating to an operator of a motor vehicle a safe distance between his motor vehicle and the next preceding motor vehicle according to claim 8 further comprising a split circular light shield for preventing extraneous light from entering said enclosure.

10. A visual sighting device for indicating to an operator of a motor vehicle a safe distance between his motor vehicle and the next preceding motor vehicle according to claim 8 further comprising a transparent covering for said opening and a small vertical shield disposed between the operator and said opening to prevent the operator from looking directly into the opening.

11. A viual sighting device for indicating to an operator of a motor vehicle a safe distance between his motor vehicle and the next preceding motor vehicle according to claim 1 further comprising means for adjusting the reference position of said luminous indicator plate to correct for the height of the driver's line of vision.

12. A visual sighting device for indicating to an operator of a motor vehicle a safe distance between his motor vehicle and the next preceding motor vehicle according to claim 1 further comprising a tray upon which said luminous indicator plate is mounted, said tray being movable forward and backward in a horizontal plane resulting in vertical movement of said indicator image guide-line.

13. A visual sighting device for indicating to an operator of a motor vehicle a safe distance between his motor vehicle and the next preceding motor vehicle according to claim 12 further comprising a pair of spaced guides, and said tray being free to slide forward and backward in said guides.

14. A visual sighting device for indicating to the operator of a motor vehicle a safe distance between his motor vehicle and the next preceding motor vehicle, said device comprising a shaft, means for angularly positioning said shaft responsive to the motor vehicle's speed, a member attached to said shaft, said member having a light reflecting surface, a light source disposed adjacent said member, whereby light is reflected from said surface forming an indicator image guide-line on the windshield in the operator's line of vision between the operator and the next preceding vehicle, a tray upon which said member is mounted, said tray being moveable forward and backward in a horizontal plane resulting in vertical movement of said indicator image guide-line, a pair of spaced guides, and said tray being free to slide forward and backward in said guides, a second plate-like member extending substantially parallel to said tray and having a pair of spaced projections extending upwardly therefrom, said tray having a pair of parallel diagonal slots through which said projections protrude, whereby lateral movement of said plate-like member causes forward and backward movement of said tray.

15. A visual sighting device for indicating to an operator of a motor vehicle a safe distance between his motor vehicle and the next preceding motor vehicle according to claim 1 wherein said means for angularly positioning said shaft responsive to the motor vehicle's speed comprises a conventional speedometer cable, a gear box, a gear in said gear box operatively connected to said speedometer cable, a second gear in said box driven by the first gear, a flexible cable attached to said second gear, a magnetic speedometer mechanism operatively connected to said flexible cable, said shaft connected to said speedometer mechanism, the angular position of which being responsive to the motor vehicle speed.

16. A visual sighting device for indicating to an operator of a motor vehicle a safe distance between his motor vehicle and the next preceding motor vehicle according to claim 15 further comprising a third gear in said gear box driven by said first gear, a cable operatively driven by said third gear, a conventional speedometer driven by a said last named cable.

17. A visual sighting device for indicating to an operator of a motor vehicle a safe distance between his motor vehicle and the next preceding motor vehicle according to claim 1 wherein said light source comprises an electrical circuit including a socket, a light bulb, a rheostat, and an electrical power supply.

18. A visual sighting device for indicating to an operator of a motor vehicle a safe distance between his motor vehicle and the next preceding motor vehicle according to claim 6 wherein said light source comprises an electrical circuit including a socket, a light bulb, a rheostat, a battery, said light bulb being disposed to direct a beam of light through the first edge of the transparent portion.

19. A visual sighting device for indicating to an operator of a motor vehicle a safe distance between his motor vehicle and the next preceding motor vehicle according to claim 1 further comprising means for correcting for parallax for the reference setting of the device for operators having different eye levels.

20. A visual sighting device for indicating to an operator of a motor vehicle a safe distance between his motor vehicle and the next preceding motor vehicle according to claim 19 wherein said means for correcting for parallax comprises a pair of sighting members, means for positioning said sighting members on the operator's line of vision, and means for adjusting said indicator image guide-line according to the position of said sighting members.

21. A visual sighting device for indicating to an operator of a motor vehicle a safe distance between his motor vehicle and the next preceding motor vehicle according to claim 20 wherein said means for positioning said sighting members comprises a tooth rack attached to each sighting member, and gear means for vertically adjusting said rocks.

22. A visual sighting device for indicating to an operator of a motor vehicle a safe distance between his motor vehicle and the next preceding motor vehicle according to claim 21 wherein said racks are mounted on the dashboard of said motor vehicle and wherein said sighting members are retractable into the dashboard when not in use.

23. A visual sighting device for indicating to an operator of a motor vehicle a safe distance between his motor vehicle and the next preceding motor vehicle, said device comprising a shaft, a speedometer cable, a gear box, a gear in said gear box operatively connected to said speedometer cable, a second gear in said box driven by the first gear, a flexible coupling attached to said second gear, a magnetic speedometer mechanism operatively connected to said flexible cable, said shaft extending from said speedometer mechanism, the angular position of which being responsive to the motor vehicle speed, a third gear in said box driven by said first gear, a cable operatively driven by said third gear, a conventional speedometer driven by said last named cable, a member attached to said shaft, said member having a transparent portion, said transparent portion having a first edge for light transmission and a second edge angularly disposed with respect to the first edge for light reflection, a third rounded edge angularly disposed with respect to said other two edges, the third edge being for light diffusion, the transparent portion of said member is a rotatable plate having its axis of rotation passing through said first edge, the first edge being perpendicular to the third edge, said member being substantially rectangular and the second edge being a line connecting two opposite corners of the rectangle forming a division between the transparent portion and the other portion, the transparent portion being about one-half of the total member whereby the transparent portion is substantially triangularly shaped, opaque sheets covering the side faces of the rotatable plate, means for adjusting the reference position of the member to correct for the height of the driver's line of vision, said last named means including a tray upon which said member is mounted, said tray being moveable forward and backward in a horizontal plane, a pair of spaced guides, said tray being free to slide forward and backward in said guides, a second plate-like member extending substantially parallel to said tray and having a pair of spaced projections protruding therefrom, said tray having diagonal slots for slidably receiving said projections whereby lateral movement of said plate-like member causes forward and backward movement of said tray, a light source disposed adjacent said transparent portion, said light source and said edges being so disposed that an indicator image guide-line is reflected on the windshield in the operator's line of vision between the operator and said next preceding vehicle, means for correcting for parallax for the reference setting of the device for operators having different eye levels, said last named means comprising a pair of sighting members, means for positioning said sighting members on the operator's line of vision, said means for positioning said sighting members including a tooth rack attached to each sighting member, gear means for vertically adjusting said racks, said racks being mounted on the dashboard of said motor vehicle, and said sighting members being retractable into the dashboard when not in use.

24. A visual sighting device for indicating to the operator of a motor vehicle a safe distance between his motor vehicle and the next preceding motor vehicle according to claim 1 wherein the axis of said shaft is disposed substantially athwart said motor vehicle.

25. A visual sighting device for indicating to the operator of a motor vehicle a safe distance between his motor vehicle and the next preceding motor vehicle according to claim 1 wherein the vertical location of the position of the guide-line on the windshield moves upwardly responsive to increasing speed of the motor vehicle in progressively smaller units.

References Cited
UNITED STATES PATENTS

| | | |
|---|---|---|
| 1,871,877 | 8/1932 | Buckman. |
| 2,158,310 | 5/1939 | Smith et al. _____ 73—499 X |
| 2,185,379 | 1/1940 | Myers et al. _____ 350—285 X |
| 2,264,044 | 11/1941 | Lee. |
| 2,579,806 | 12/1951 | Dvorkin. |
| 2,641,159 | 6/1953 | Mihalakis. |

JOHN W. CALDWELL, Primary Examiner

MICHAEL SLOBASKY, Assistant Examiner

U.S. Cl. X.R.

340—62, 103, 263; 356—29